9595X
C. W. Peckham.
Coffee Mill.
Patented Apr. 13, 1836.
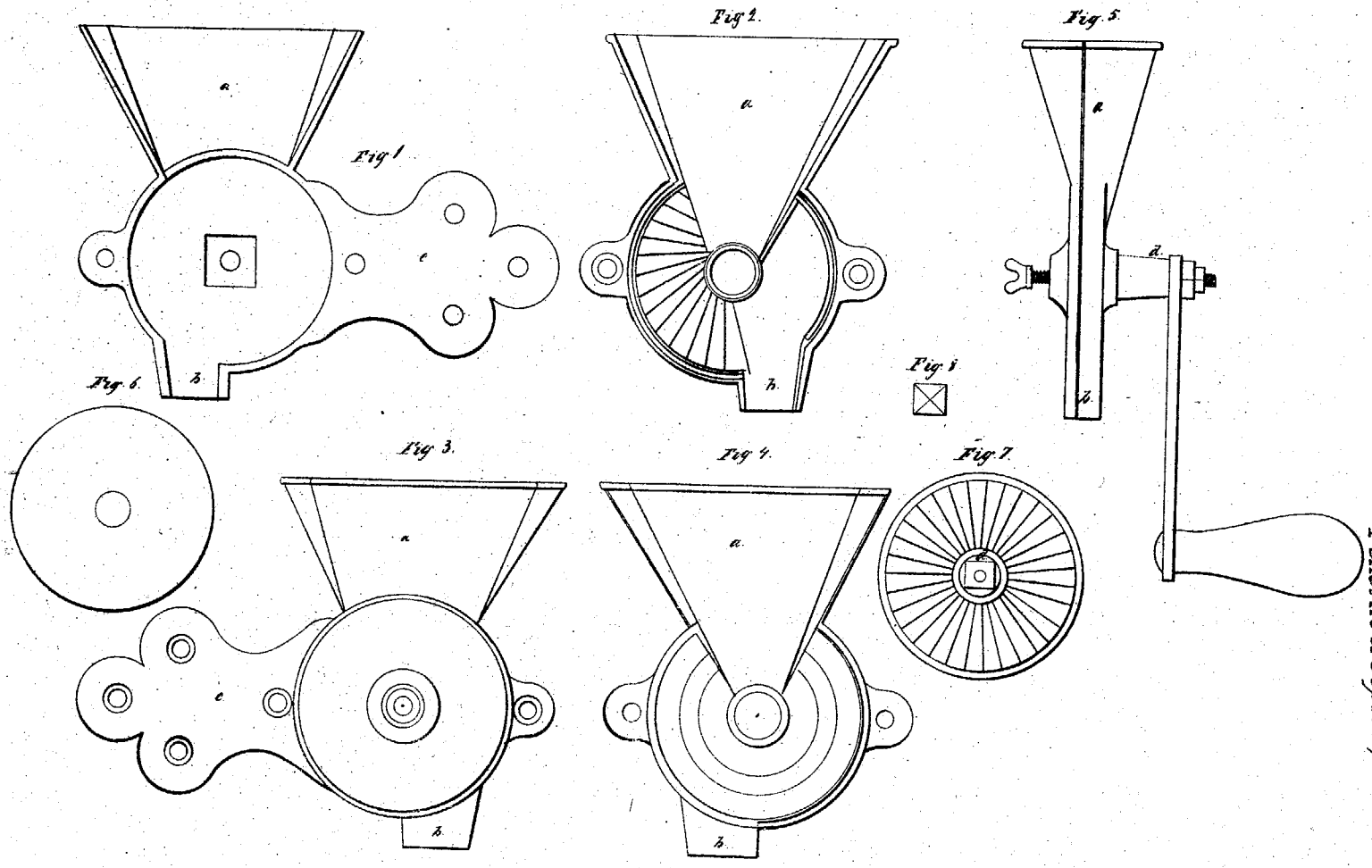

4/13/1836 9595x

Charles M. Peckham — New Haven, Connecticut.
Letters Patent Dated April 13th 1836.

The Schedule referred to in these Letters Patent and making part of the same,
containing a description in the words of the said Charles M. Peckham himself of
his "Improvement in Coffee Mills."

To all to whom these presents shall come: Be it known that I, Charles M.
Peckham, of New Haven, in the County of New Haven, in the State of Connecticut, a
native citizen of the United States, have invented a new and useful improvem[ent]
in the construction of Coffee Mills, which I call "Peckham's improved Coffee M[ill]
& that the following is a full and exact description thereof. My improved Coffee Mill
may be made of cast iron, or other suitable metal, & consist principally of the follo[wing]
parts, viz. a Runner, a front & rear shell an axle or shaft, a regulator, & a win[ch]
or crank. The runner is a flat wheel of hard metal, about three inches in diame[ter]
& three eighths of an inch thick with teeth formed on one side by ledges radiat[ing]
from the centre; also having teeth on the outer edge or circumference of the runne[r]
At the back of the runner & outside of the teeth is a guard to prevent the teeth of the
runner coming in contact with the teeth of the front shell. The front shell covers t[he]
runner & has a lip around it as high as the thickness of the runner & is arme[d]
with opposing teeth on the inside of the lip corresponding with the teeth on the oute[r]
rim of the runner, & also with teeth or ledges radiating horizontally from the top [of]
the axle, of the runner as tangents & extending to & up the inside of the lip
These radiating ledges on the front shell extend from the mouth of the hopper to th[e]
discharging spout & the remaining surface of the shell is depressed as deep as the bo[ttom]
of the ledges leaving a smooth surface without ledges excepting a guard ledge t[o]
guide the feeding from the hopper in the course of the runner, & prevent cloggi[ng]
To aid the feeding the ledges on the shell for about one inch from the mouth of the h[op]
per are gradually sunk down and lessen'd, to give a more free entrance into the [m]
The back shell is similar in shape to the front shell, but is not armed with teeth [or]
ledges. On the corresponding sides of these shells are projections to form the hopper & d[is]
charging spout when put together, & ears to secure them by screws or rivets. & a[n]
arm extends from the back plate or shell to secure the mill in its place. In the cent[re]
front shell is a hole to receive the axle of the runner which may be cast sep[arate]

4/13/1836 9595X connected with the runner. The axle extending in front is made square at the end to receive the winch, which is fastened by a nut on the end of the axle. The mill is regulated by a thumb [illegible] at the back plate acting against the collet or washer.

For further illustration of my invention I refer to the model & drawings of the same deposited in the Patent Office.

I claim as my invention and improvement the peculiar construction of the grinding surfaces of the Mill. I also claim the Guard around the axle as above specif. & therefore I solicit Letters Patent, according to law.

Dated at New Haven Sept. 29th 1835.

Witnesses
Wm. T. Peckham
George S. Mansfield

Charles W. Peckham (612 words) [illegible]

(Received & Recorded anew December 18. 1841.)

Drawing made